United States Patent

Yamakawa et al.

[11] Patent Number: 6,121,748
[45] Date of Patent: Sep. 19, 2000

[54] METHOD AND APPARATUS FOR CONTROLLING AN INDUCTION MOTOR

[75] Inventors: Takayuki Yamakawa; Toshio Miyano, both of Fukuoka, Japan

[73] Assignee: Kabushiki Kaisha Yaskawa Denki, Japan

[21] Appl. No.: 09/214,918

[22] PCT Filed: Jul. 9, 1997

[86] PCT No.: PCT/JP97/02374

§ 371 Date: Jan. 11, 1999

§ 102(e) Date: Jan. 11, 1999

[87] PCT Pub. No.: WO98/02958

PCT Pub. Date: Jan. 22, 1998

[30] Foreign Application Priority Data

Jul. 12, 1996 [JP] Japan .................................. 8-182981

[51] Int. Cl.[7] .............................. H02P 5/40; B61C 15/08
[52] U.S. Cl. ......................... 318/801; 318/805; 318/806; 318/807
[58] Field of Search ..................................... 318/799–808, 318/138, 245, 254, 52, 49, 69, 71

[56] References Cited

U.S. PATENT DOCUMENTS

| | | | |
|---|---|---|---|
| 3,983,463 | 9/1976 | Nabae et al. ............................. | 318/801 |
| 4,450,398 | 5/1984 | Bose ........................................ | 318/803 |
| 5,272,429 | 12/1993 | Lipo et al. .............................. | 318/808 |
| 5,444,351 | 8/1995 | Yamamura et al. .................... | 318/811 |
| 5,731,682 | 3/1998 | Yamakawa .............................. | 318/805 |
| 5,796,237 | 8/1998 | Yamakawa .............................. | 318/806 |
| 5,811,956 | 9/1998 | Yamamoto ............................... | 318/801 |

*Primary Examiner*—Paul Ip

[57] ABSTRACT

In an inverter controlling method for an induction motor, the slip of the motor is detected and an optimum slip which is dependent on the motor constant and the frequency supplied to the motor providing the highest efficiency is calculated, and a voltage manipulated variable is determined from a comparison of the optimum slip and the slip of the motor, and then the voltage manipulated variable is used to form an output voltage instruction or a magnetic flux instruction so that running of the induction motor is controlled with the slip with which the highest efficiency is provided with respect to load variation and frequency variation.

5 Claims, 3 Drawing Sheets

METHOD AND APPARATUS FOR CONTROLLING AN INDUCTION MOTOR

This application is a 371 of PCT/JP97/02374 filed Jul. 9, 1997.

TECHNICAL FIELD

This invention relates to a controlling method and apparatus for an induction motor (hereinafter referred to simply as "motor") which is applied for running the motor at its highest efficiency at all times irrespective of load variation or frequency variation.

BACKGROUND ART

Running of a motor by an inverter is normally performed with a fixed ratio of V (voltage)/f(frequency). If a running frequency has been determined, the motor has a slip at which it exhibits the highest efficiency, and this value does not depend on the magnitude of the load.

In running wherein ratio V/f is fixed, if frequency f is determined, then since the voltage is fixed, as the load varies, the slip varies and accordingly the efficiency varies, and therefore, it is impossible to always run the motor at the highest efficiency. Here, several conventional techniques of the type described are slightly examined.

As conventional technique 1, Japanese Patent Publication No. 41029/1991 discloses a method for reducing the drop in efficiency caused by load variation. According to conventional technique 1, a running method for an induction motor driven by a voltage type inverter is characterized in that, when the motor enters a steady running condition, an output voltage and an output current of the inverter are multiplied to determine output power $P_N$ and the output voltage of the inverter is reduced to voltage $V_1$ which is lower by a V than output voltage $V_0$ at the beginning of the steady running. The difference $\Delta P_1$ between output power $P_1$ of the inverter calculated at that time and output power $P_0$ of the inverter in the beginning of the steady running is compared with constant $\Delta P_S$ and then, if $\Delta P_1 < \Delta P_S$, the inverter output voltage is fixed to the voltage $V_1$. But if $\Delta P_1 \geq \Delta P_S$, and after a fixed period the inverter output voltage is further reduced by $\Delta V$ from voltage $V_1$, the value of the reduction (difference) of the output power at that time and the constant $\Delta P_S$ are compared with each other and the inverter output voltage is fixed or further reduced depending upon the relationship in magnitude between them, the steps being repeated to run the motor with the output voltage of the inverter.

Further, as conventional technique 2, Japanese Patent Laid-Open No. 203700/1995 discloses a method wherein a slip to obtain the highest efficiency is calculated from the motor constant and the frequency. The application of voltage to the motor is controlled to obtain the calculated slip. By this method, when the motor enters a steady running condition, the output voltage and the output current of the inverter are multiplied to determine output power $P_N$, and the voltage which will achieve the highest efficiency with this power and frequency is calculated and supplied to the motor to control the motor indirectly for optimum slip.

DISCLOSURE OF INVENTION

However, with the method of conventional technique 1, since the minimum power running condition is sought while varying the voltage by small amounts, much time is required until the point of the minimum power is reached, and accordingly, there is a problem that the responsiveness to load variation is low. Meanwhile, with the method of conventional technique 2, since the motor is controlled indirectly to obtain the slip with the highest efficiency, there is a problem with accuracy. Further, as application of vector control to general purpose inverters proceeds, this controlling method has a problem in that it cannot be applied to a vector control inverter in which an excitation current and a current for torque are controlled independently of each other.

The present invention has been made in view of such problems of conventional techniques as described above, and it is an object of the present invention to provide a controlling method and apparatus for an induction motor in which the slip of the induction motor is controlled rapidly so that the efficiency of the induction motor may always be highest with respect to load variation and frequency variation.

In order to solve the problems described above, according to the present invention, a controlling method for an inverter controlled induction motor wherein the slip of said induction motor is detected and the optimum slip $S \eta_{MAX}$ dependent on the constant of said induction motor and the frequency supplied to said induction motor providing the highest efficiency is calculated by the following formula $$S\eta_{MAX} = r_2/Lm[r_m/2/\pi/(r_1+r_2)]^{1/2}/(f_0)^{1/2}$$

where $r_1$ is the primary resistance of said induction motor,
$r_2$ is the secondary resistance of said induction motor,
Lm is the excitation inductance of said induction motor,
$r_m$ is the iron loss resistance of said induction motor, and
$f_0$ is the supply frequency to said induction motor, the optimum slip and the slip of said induction motor are compared to determine a voltage manipulated variable which is used to form an output voltage and magnetic flux instruction for running said induction motor at the slip which provides the highest efficiency.

Also, according to the present invention, a controlling apparatus for an inverter controlled induction motor comprising a means for detecting the slip of said induction motor, means for calculating the optimum slip $S \eta_{MAX}$ dependent on the constant of said induction motor and the frequency supplied to said induction motor providing the highest efficiency by the following formula $$S\eta_{MAX} = r_2/Lm[r_m/2/\pi/(r_1+r_2)]^{1/2}/(f_0)^{1/2}$$

where $r_1$ is the primary resistance of said induction motor,
$r_2$ is the secondary resistance of said induction motor,
Lm is the excitation inductance of said induction motor,
$r_m$ is the iron loss resistance of said induction motor, and
$f_0$ is the supply frequency to said induction motor, a comparator for comparing the optimum slip and the slip of said induction motor, and a calculation means for calculating a voltage manipulated variable from the result of the comparison, wherein said voltage manipulated variable is used to form a magnetic flux instruction for running said induction motor at the slip which provides the highest efficiency.

Further, the control apparatus for an induction motor is characterized in that the means for calculating optimum slip calculates optimum slip $S_f$ for a supplied frequency by calculating the product of the optimum slip $S \eta_{MAX}$, is determined from the motor constant and a specific frequency $f_0$, and a ratio $(f_0/f)^{1/2}$ when the supplied frequency is frequency f, and characterized in that the means for calculating a voltage manipulated variable determines a voltage manipulated variable by calculating the product of the result of the comparison and the gain coefficient K dependent on the load torque of the motor and optimum slip, and that the gain coefficient K increases in proportion to an exponential function of the motor torque and increases in inverse proportion to the optimum slip S $\eta_{MAX}$. The said means for calculating a voltage manipulated variable calculates the voltage manipulated variable by calculating the product of the result of the comparison and gain coefficient K dependent on the load torque of said induction motor and the optimum slip.

According to the present invention, The slip is not controlled indirectly to obtain the highest efficiency as in the conventional techniques and the point of the lowest power is not searched out little by little while varying the inverter output voltage. The slip of the induction motor is detected directly and the detected slip value and an optimum slip value dependent on the constant of the motor and the running frequency which provides the highest efficiency are compared. Then a voltage manipulated variable based on the result, the comparison is used to form a magnetic flux instruction, whereby the slip is controlled rapidly to obtain the highest efficiency even if load conditions change or a given frequency varies.

BEST MODE FOR CARRYING OUT THE INVENTION

In the following, the best mode for utilizing out the invention is described with reference to the drawings.

Figure 1:
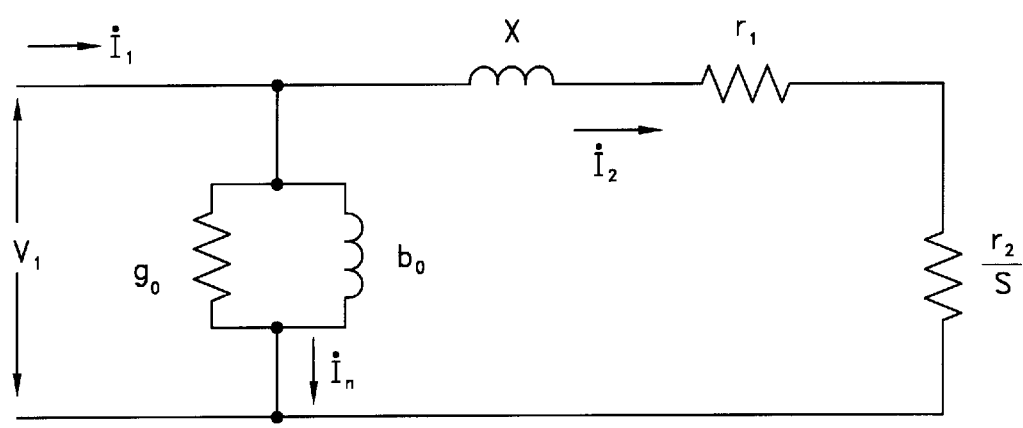
FIG. 1 is an L-type equivalent circuit of an induction motor.

FIG. 1 shows an L-type equivalent circuit of an induction motor of an embodiment of the present invention.

Referring to FIG. 1, reference symbol $V_1$ represents a phase voltage, $I_1$ a primary current, $r_1$ a primary resistance, $r_2$ a secondary resistance, x a sum of primary and secondary reactances, go an excitation conductance, $b_0$ an excitation susceptance, and S a motor slip. Where a complex symbol is represented by j, from the equivalent circuit shown, the following expressions are formed:

Vector $I_1 = \{1/(r_2/S + r_1 + jx) + g_0 - jb_0\}V_1$ (1)

Vector $I_2 = V_1/(r_2/S + r_1 + jx)$ (2)

Vector $I_N = (g_0 - jb_0)V_1$ (3)

Primary input complex power vector $Pa_1$ is given, where the number of phase of the power supply is m, by Vector $Pa_1 = m \times$ vector $I_1 \times V_1 = m[(r_2/S + r_1)/((r_2/S + r_1)^2 + x^2) + g_0 - j\{x/((r_2/S + r_2)^2 + x^2) + b_0\}]V_1^2$ (4)

Since the primary input power is given by the real number part of the expression (4), Primary input power $P_1 = \{r_2/S + r_1\}/((r_2/S + r_1)^2 + x^2) + g_0\}mV_1^2$ (5)

and secondary complex power vector $Pa_2$ is given by

Vector $Pa_2 = m$(vector $I_2V_1 - I_2^2r_1) = m[(r_2/S)/((r_2/S + r_1)^2 + x^2) - j\{x/((r_2/S + r_1)^2 + x^2)\}]V_1^2$ (6)

Since the secondary input power is given by the real number part of the expression (6), Secondary input power $P_2 = \{r_2/S/((r_2/S + r_1)^2 + x^2)\}mV_1^2$ (7)

Secondary loss $P_{21} = mI_2^2r_2 = r_2/((r_2/S + r_1)^2 + x^2)mV_1^2$ (8)

Mechanical loss $P_0 = P_2 - P_{21} = r_2(1-S)/S/((r_2/S + r_1)^2 + x^2)mV_1^2$ (9)

Efficiency $\eta = P_0/P_1 = r_2(1-S)/S/\{r_2/S + r_1 + g_0((r_2/S + r_1)^2 + x^2)\}$ (10)

The slip that provides the highest efficiency is obtained by differentiating efficiency n of expression (10) with motor slip S until the value of S becomes zero. Accordingly, the slip S $\eta_{MAX}$ which provides the highest efficiency is given by $S\eta_{MAX} = [r_2[g_0^2\{(r_1+r_2)^2+x^2\} + g_0(r_1+r_2)]^{1/2} - g_0r_2^2]/[g_0\{(r_1+r_2)^2+x^2-r_2^2\}+r_1+r_2]$ (11)

Since expression (11) is a function only of motor constants and frequency, it is not influenced by the load or the input voltage if only the frequency is determined. Accordingly, if the motor is controlled so that optimum slip S $\eta_{MAX}$ is maintained, it can be run at the highest efficiency.

However, in order to calculate the optimum slip from expression (11), the constants of the motor must be known. Further, even if they are known, since a large amount of calculation is required, to perform the calculation for each disadvantageous scanning imposes an excessively high burden on a CPU and is not practical. Therefore, approximation as described below is used.

Since, in expression (11), $g_0\{(r_1+r_2)^2+x^2\}$ and $g_0\{(r_1+r_2)^2+x^2-r_2^2\}$ are exceedingly small compared with $(r_1+r_2)$ at a frequency that is higher than 1 Hz, they can be disregarded and expression (11) written as $S\eta_{MAX} = [r_2\{g_0(r_1+r_2)\}^{1/2} - g_0r_2^2]/(r_1+r_2)$ (12)

Further, since $r_2\{g_0(r_1+r_2)\}^{1/2}$ in the numerator of expression (12) is exceedingly large compared with $g_0r_2$ it can be disregarded and expression (12) written as $S\eta_{MAX} = r_2\{g_0(r_1+r_2)\}^{1/2} = \{r_m/2/\pi/(r_1+r_2)\}^{1/2}r_2/Lm/f^{1/2} = K_0/f^{1/2}$ (13)

(where $K_0 = \{r_m/2/\pi/(r_1+r_2)\}^{1/2}r_2/Lm$)

In particular, it can be seen that optimum slip S $\eta_{MAX}$ increases in proportion to the inverse number of the square root of the frequency. Accordingly, if optimum slip S $\eta_{MAX}$ when the frequency is the rated frequency $f_0$ and is known, then optimum slip $S_1$ when the frequency is arbitrary frequency f can be calculated in accordance with $S_1 = S\eta_{MAX}(f_0/f)^{1/2}$ (14)

Figure 2:
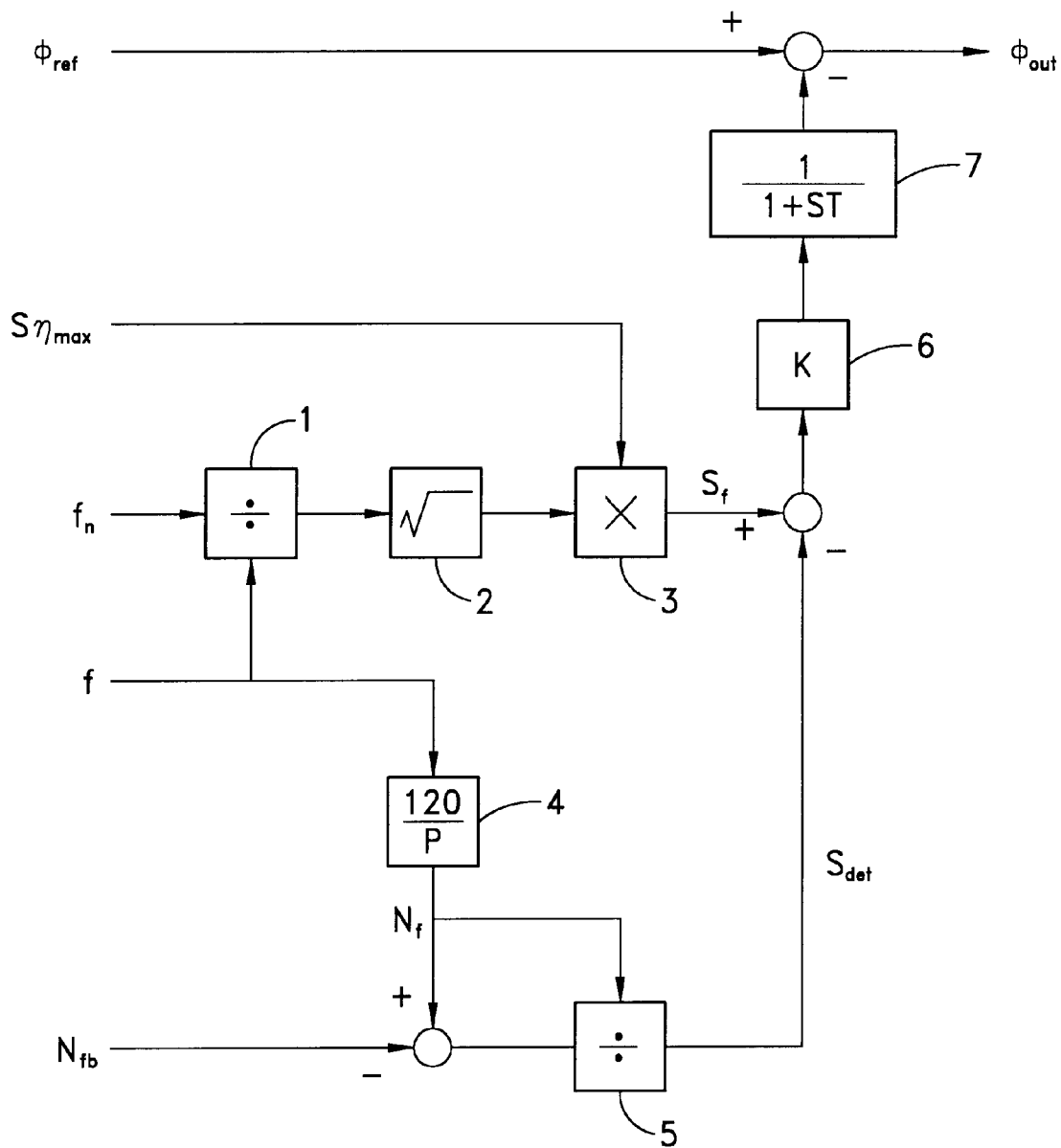
FIG. 2 is a block diagram showing a circuit construction in an embodiment of the present invention.

In the following, an embodiment of the present invention is described with reference to a block diagram showing a circuit construction of the same. FIG. 2 shows an embodiment in which the present invention is applied to vector control.

Referring to FIG. 2, reference numerals 1 and 5 each denote a divider, 2 denotes a square root calculator, 3 a multiplier, 4 a frequency-synchronous speed converter, 6 a gain coefficient multiplier, and 7 a filter. Further, reference symbol $\phi_{ref}$ denotes a magnetic flux instruction (prior to variation), and $\phi_{out}$ denotes a magnetic flux instruction after variation. Reference symbol S $\eta_{MAX}$ denotes a slip which provides the highest efficiency at a rated frequency. Recent vector control involves an automatic tuning function, and no significant difference occurs even if a rated slip specified by automatic tuning is used as slip S $\eta_{MAX}$ which provides the highest efficiency. Further, reference symbol $f_n$ denotes a rated frequency, f a running frequency, and $N_{fb}$ a speed feedback value.

Control in the present embodiment is described.

Based on expression (14), frequency $f_n$ is divided by running frequency f at divider 1 and the value of the square root of the result of the division determined by square root calculator 2 is multiplied at multiplier 3 by the slip S $\eta_{MAX}$ which provides the highest efficiency for a rated frequency to determine optimum slip $S_f$ for a running frequency.

Meanwhile, running frequency f is multiplied by 120/P (the number of poles of the motor) at frequency-synchronous speed converter 4 to determine synchronous rotational frequency $N_f$, and the value obtained by subtracting speed feedback value $N_{fb}$ from synchronous rotational frequency $N_f$ is divided by synchronous frequency $N_f$ at divider 5 to determine slip $S_{det}$ of the motor. The value obtained by subtracting this slip $S_{det}$ of the motor from optimum slip $S_f$ is multiplied by gain coefficient K at multiplier 6, and the result of the multiplication is passed through a filter for stabilization of control, whereafter it is subtracted from magnetic flux instruction $\phi_{ref}$ to obtain magnetic flux instruction $\phi_{out}$.

When slip $S_{det}$ is smaller than optimum slip $S_f$, since the magnetic flux is small, control is performed by varying the output voltage to make slip $S_{det}$ approach optimum slip $S_f$. In this manner, the motor is run at the highest efficiency.

Gain coefficient K is determined in the following manner.

When there is no energy saving control, with output voltage $V_1$, slip $S_1$, highest motor efficiency voltage $V_2$, and the slip by $S_2$, gain coefficient K can be calculated by $$K=(V_1-V_2)(S_2-S_1)$$

Since $V_1$, $V_2$, $S_1$ and $S_2$ vary with the optimum slip and the load in rated running, the value of K must be changed accordingly.

Figure 3:
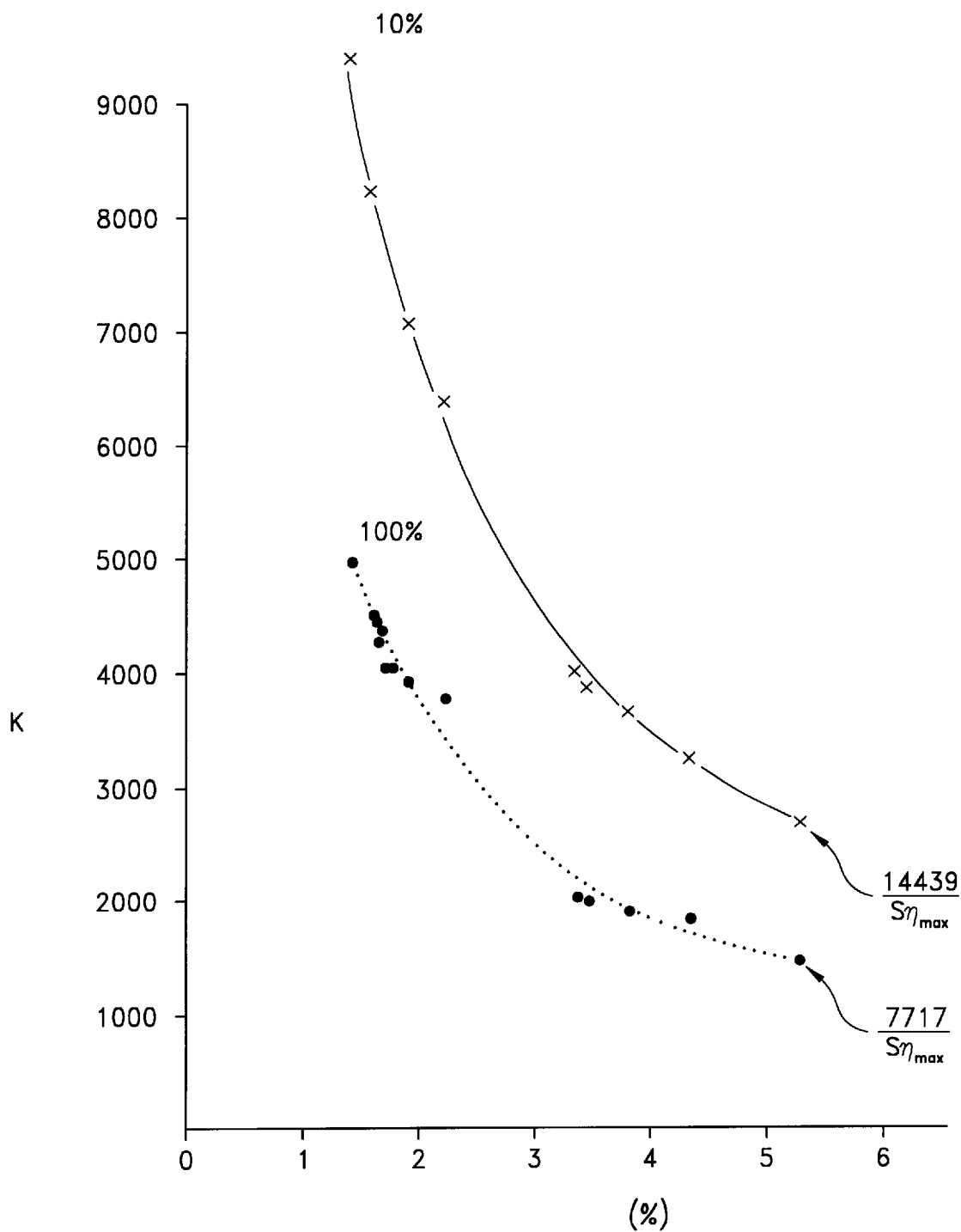
FIG. 3 is a graph illustrating a relationship between optimum slip $S_f$ and gain coefficient K where a load factor is used as a parameter.

When the value of coefficient K with respect to the optimum slip and the load factor was calculated with regard to motors of 0.4 to 55 kW and the relationship between them was investigated, the value of coefficient K increased in inverse proportion to the optimum slip, but had an exponential relationship to the load factor. When this is shown by graph, such as shown in FIG. 3 coefficient K is obtained. In FIG. 3, the axis of abscissa indicates the optimum slip (%), the axis of ordinate the gain coefficient K, and parameters of the load factor (%).

In this instance, the value of gain coefficient k is $k=15480\exp(-0.696T_L)/S\eta_{MAX}$ $T_L$: load torque

What is claimed is:

1. A controlling method for an inverter controlled induction motor wherein the slip of said induction motor is detected and the optimum slip S $\eta_{MAX}$ dependent on the constant of said induction motor and the frequency supplied to said induction motor providing the highest efficiency is calculated by the following formula;

$$S\eta_{MAX}=r_2/Lm[r_m/2/\pi/(r_1+r_2)]^{1/2}/(f_0)^{1/2}$$

where $r_1$ is the primary resistance of said induction motor, $r_2$ is the secondary resistance of said induction motor, Lm is the excitation inductance of said induction motor, $r_m$ is the iron loss resistance of said induction motor, and $f_0$ is the supply frequency to said induction motor, the optimum slip and the slip of said induction motor are compared to determine a voltage manipulated variable which is used to form an output voltage and magnetic flux instruction for running said induction motor at the slip which provides the highest efficiency.

2. A controlling apparatus for an inverter controlled induction motor comprising a means for detecting the slip of said induction motor, a means for calculating the optimum slip S $\eta_{MAX}$ dependent on the constant of said induction motor and the frequency supplied to said induction motor providing the highest efficiency by the following formula;

$$S\eta_{MAX}=r_2/Lm[r_m/2/\pi/(r_1+r_2)]^{1/2}/(f_0)^{1/2}$$

where $r_1$ is the primary resistance of said induction motor, $r_2$ is the secondary resistance of said induction motor, Lm is the excitation inductance of said induction motor, $r_m$ is the iron loss resistance of said induction motor, and $f_0$ is the supply frequency to said induction motor, a comparator for comparing the optimum slip and the slip of said induction motor, and a calculation means for calculating a voltage manipulated variable from the result of the comparison, wherein said voltage manipulated variable is used to form a magnetic flux instruction for running said induction motor at the slip which provides the highest efficiency.

3. A controlling apparatus for the induction motor of claim 2, characterized in that said means for calculating an optimum slip calculates the optimum slip $S_f$ for a supplied frequency by calculating the product of optimum slip S $\eta_{MAX}$, determined from the motor constant and a specific frequency $f_0$, and a ratio $(f_0/f)^{1/2}$ when the supplied frequency is frequency f.

4. A controlling apparatus for the induction motor of claim 2, characterized in that said means for calculating a voltage manipulated variable calculates a voltage manipulated variable by calculating the product of the result of the comparison and gain coefficient K dependent on the load torque of said induction motor and the optimum slip.

5. A controlling apparatus for the induction motor of claim 2, characterized in that gain coefficient K increases in proportion to the exponential function of the motor torque and increases in inverse proportion to the optimum slip S $\eta_{MAX}$, and said means for calculating a voltage manipulated variable calculates the voltage manipulated variable by calculating the product of the result of the comparison and gain coefficient K dependent on the load torque of said induction motor and the optimum slip.

* * * * *